United States Patent [19]

Wiley

[11] Patent Number: 4,818,438

[45] Date of Patent: Apr. 4, 1989

[54] CONDUCTIVE COATING FOR ELONGATED CONDUCTORS

[75] Inventor: Robert E. Wiley, Port Huron, Mich.

[73] Assignee: Acheson Industries, Inc., Port Huron, Mich.

[21] Appl. No.: 757,085

[22] Filed: Jul. 19, 1985

[51] Int. Cl.$^4$ ............................................. H01B 1/06
[52] U.S. Cl. ................................. 252/511; 252/502;
252/503; 252/506; 252/510; 523/457; 523/458;
523/459; 523/468; 524/495; 524/496; 524/439;
524/440; 524/401; 524/430; 174/120 SC;
174/102 SC; 338/214
[58] Field of Search ............... 252/502, 503, 511, 510,
252/506, 512, 513, 514, 518, 519; 208/39, 50,
22, 400, 14; 174/102 SC, 120 SC; 423/460, 461;
338/66, 214; 524/495, 496, 439, 440, 401, 430

[56] References Cited

U.S. PATENT DOCUMENTS

| | | |
|---|---|---|
| 1,504,292 | 8/1924 | Wickes . |
| 2,328,198 | 8/1943 | Davenport et al. . |
| 2,730,597 | 1/1956 | Podolsky et al. ..................... 201/63 |
| 3,048,515 | 8/1962 | Dalton ................................. 162/126 |
| 3,096,229 | 7/1963 | Whitman ............................. 162/135 |
| 3,149,023 | 9/1964 | Bodendorf et al. ................. 162/135 |
| 3,151,050 | 9/1964 | Wilburn ............................... 204/147 |
| 3,265,557 | 8/1966 | Frics et al. . |
| 3,273,779 | 9/1966 | Mykleby .............................. 229/14 |
| 3,367,851 | 2/1968 | Filreis et al. ........................ 204/2 |
| 3,391,103 | 7/1968 | Mueller ............................... 260/38 |
| 3,404,019 | 10/1968 | Gotshall ............................. 106/307 |
| 3,444,183 | 5/1969 | Hubbuch ............................ 260/32.6 |
| 3,505,263 | 4/1970 | Roth ................................... 260/29.6 |
| 3,615,754 | 10/1971 | Gotshall ............................. 524/495 |
| 3,653,498 | 4/1972 | Kisor .................................. 206/46 |
| 3,746,157 | 7/1973 | I'Anson .............................. 206/46 |
| 3,774,757 | 11/1973 | Harris et al. ....................... 206/62 |
| 3,868,313 | 2/1975 | Gay .................................... 204/196 |
| 3,870,987 | 3/1975 | Wiley ................................. 338/214 |
| 3,954,674 | 5/1976 | Reis .................................... 252/502 |
| 3,962,142 | 6/1976 | Freeman et al. ................... 252/502 |
| 4,035,265 | 7/1977 | Saunders ........................... 252/510 |
| 4,037,267 | 7/1977 | Kisor .................................. 361/220 |
| 4,038,693 | 7/1977 | Huffine et al. .................... 360/99 |
| 4,084,210 | 4/1978 | Forrest .............................. 361/212 |
| 4,108,798 | 8/1978 | Sze et al. ........................... 252/502 |
| 4,160,503 | 7/1979 | Ohlbach ............................. 206/328 |
| 4,188,279 | 2/1980 | Yan .................................... 252/510 |
| 4,211,324 | 7/1980 | Ohlbach ............................. 206/328 |
| 4,241,829 | 12/1980 | Hardy ............................... 206/328 |
| 4,293,070 | 10/1981 | Ohlbach ............................. 206/328 |
| 4,369,171 | 1/1983 | Grindstaff et al. ................ 252/502 |
| 4,444,837 | 4/1984 | Blum .................................. 428/332 |
| 4,476,265 | 10/1984 | Blackwell, Jr. .................... 524/10 |
| 4,482,048 | 11/1984 | Blodgett ............................ 206/328 |
| 4,483,840 | 11/1984 | Delhay et al. ..................... 252/511 |

OTHER PUBLICATIONS

Preliminary Technical Bulletin 4-2-14c, Eccocoat Sec—Electrically Resistive Flexible Coating Emerson & Cuming, 7/24/74, Coating.

(List continued on next page.)

*Primary Examiner*—Josephine Barr
*Attorney, Agent, or Firm*—Harness, Dickey & Pierce

[57] ABSTRACT

Disclosed are improved compositions useful in providing a conductive layer or coating on or within a conductor. The compositions contain elemental carbon and a polymeric matrix or binder. The improvement comprises employing a unique ground calcined, coal-based coke which approaches graphite in terms of its performance as a conductive additive or pigment but does not possess the disadvantages associated with the use of graphite.

The unique coke employed in the compositions and methods of the present invention has a significant level of graphitic structure. This level of graphitization can be most easily recognized by utilizing x-ray powder diffraction. More specifically, when the value of $E_c$ or the inverse peak width (using the 002 peak) is measured for this material using Mo $K\alpha$ radiation ($\lambda=0.71$ Å), the value is in the range of about 27 to about 80, and preferably about 28 to about 75.

The final compositions employ a polymer resin or matrix system as a binder, preferably an acrylic emulsion or a fluoroelastomer. They are particularly useful as a sheath coating for elongated conductors such as automobile ignition cables.

The invention also relates to the method of applying the compositions to the conductors, and the resulting coated conductor.

24 Claims, 1 Drawing Sheet

OTHER PUBLICATIONS

Technical Bulletin 4-2-14B, Eccocoat 256 and 257, Carbon Based Lacquers, Emerson & Cuming, 2/6/75.
Conductive Paints for EMI Shielding, Grounding and Static Discharge, Tecknit, 1977.
Conductive Coatings Cut Costs, Simplify Electrical Designs, Acheson Colloids Co., Nov., 1971.
Resistance Coatings, Acheson Colloids Co., Dec., 1970.
Aerodag G, Acheson Colloids Co., 1971.
Electrodag 37, Acheson Colloids Co., 1971.
Aquadag E, Acheson Colloids Co., 1971.
Ends Static Interference, Acheson Colloids Co., Dec., 1974.
Electrodag Coatings, Acheson Colloids Co., 1971.
Kaleidoscope, Acheson Colloids Co., 1973.
Plastic World, Cahners Publishing Co., Inc., 3/19/76.
Condoct-O-Carton, Republic Packaging Corp.
Electrostatic Shielding, Acheson Colloids Co., 1955.
*Electrodag +501*, Acheson News, Product Application, Acheson Colloids Company, Division of Acheson Industries, Inc., (9/23/75).
Abstract, Lakokras Mater., Primenenie, No. 1, 1974, pp. 21-23, (In Russian), Inst. Pap. Chem., vol. 46, No. 6, Dec. 1975, p. 618, Ioshpe, M. L.
*The Strange Case of Element* 6, Lubrication Engineering, 4/1961, Acheson Colloids Company.
*A List of "Dag" Dispersions of Colloidal Graphite and Other Solids,* Dag Dispersions, Acheson Colloids Limited, First Published, 5/1955.

CONDUCTIVE COATING FOR ELONGATED CONDUCTORS

The present invention relates to improved compositions which are useful in providing a conductive coating or layer upon or within an elongated conductor such as an ignition cable. The compositions, which contain elemental carbon and a polymer binder or matrix, are improved by the addition of a unique ground high-conductivity/low-resistivity calcined coal-based coke.

More specifically, the present invention relates to a composition useful in the manufacture of automobile ignition cables and other elongated conductors. The composition may be used as an intermediate layer, an external layer, or both. The invention also relates to the method of manufacturing such conductors by employing these compositions. The invention further relates to the resultant coated conductor.

BACKGROUND OF THE INVENTION

It is well known that various elemental carbon materials can be employed as a pigment to provide conductivity in various applications. For example, U.S. Pat. No. 3,870,987, issued Mar. 11, 1975 to Wiley, et al., incorporated herein by reference, discloses a multilayer ignition cable employing a graphite impregnated fiberglass conductor layer as well as a fluoroelastomer overcoating which employs graphite or conductive carbon black.

U.S. Pat. No. 3,868,313, issued to P. J. Gay, Feb. 25, 1975, discloses a cathodic protection system comprising applying an electrically insulating coating on the substrate followed by the application of an electrically conductive coating applied over the insulating coating. A D.C. voltage is then applied between the metal substrate and the conductive coating.

U.S. Pat. No. 3,151,050, issued Sept. 19, 1964, discloses methods for cathodic protection for vehicles and components in storage. The method comprises the application of an electrically conductive paint to the metal to be protected. The paint is a suspension of carbon, manganese dioxide, ammonium chloride and an organic filler and a solvent such as methyl-ethyl-ketone. A second coating of resin containing metallic copper is then applied, followed by a final coat of paint or enamel. Lastly a D.C. voltage is applied between the conducting paint and the metal base.

U.S. Pat. No. 4,035,265, issued July 12, 1977, to J. A. Saunders discloses electrically conductive paint compositions employing graphite and colloidal carbon. The graphite is subjected to wet grinding so as to reduce the graphite to thin platelets. The colloidal carbon employed consists of particles having a size from 20 to 50 millimicrons. The final composition (including the article it is applied to) is used as a heat source when electrical current is passed through the coating.

Other state-of-the-art efforts at carbon-containing coatings are found in (1) U.S. Pat. No. 3,505,263, which discloses finely divided calcined petroleum coke in a polymer latex binder;

(2) U.S. Pat. No. 3,404,019, which discloses the use of fluid petroleum coke as a filler or pigment in polymeric compositions;

(3) U.S. Pat. No. 2,730,597, which discloses resistance elements which optionally employ various materials in a resin base;

(4) U.S. Pat. No. 4,476,265, which discloses poly (arylene sulfide) compositions which contain a "black carbonaceous pigment";

(5) U.S. Pat. No. 4,444,837, discloses coating or sealing-type plastisols which contain carbon dust as a filler;

(6) U.S. Pat. No. 3,391,103, which discloses phenolic resin compositions which employ "oxidized carbon particles";

(7) U.S. Pat. No. 3,615,754, which discloses an ink which employs 2 to 10 percent of ground coke; and (8) U.S. Pat. No. 3,444,183, which discloses a film forming composition made from a heat-resistant polymer and a dispersion of carbon particles.

SUMMARY OF THE INVENTION

The present invention relates to improved compositions useful in providing a conductive layer or coating on or within a conductor. The compositions contain elemental carbon and a polymeric matrix or binder. The improvement comprises employing a unique ground calcined, coal-based coke which approaches graphite in terms of its performance as a conductive additive or pigment but does not possess the disadvantages associated with the use of graphite.

The unique coke employed in the compositions and methods of the present invention has a significant level of graphitic structure. This level of graphitization can be most easily recognized by utilizing x-ray powder diffraction. More specifically, when the value of $E_c$ or the inverse peak width (using the 002 peak) is measured for this material using Mo $K_\alpha$ radiation ($\lambda = 0.71$ Å), the value is in the range of about 27 to about 80, and preferably about 28 to about 75. In a highly preferred embodiment, the cokes employed in the compositions and methods of the present invention contain $SiO_2$, $Fe_2O_3$, $Al_2O_3$, $Ca_2O$, $K_2O$ and $Na_2O$. They have a carbon content of at least about 90 percent and more preferably about 94.5 percent, by weight of the coke, and an ash content of about 0.1 percent to about 1.5 percent, by weight of the coke. The weight:weight ratio of $SiO_2$:$Fe_2O_3$ in the ash is in the range of about 3:1 to about 7:1, and the weight:weight ratio of $Fe_2O_3$:$Al_2O_3$ in the ash is in the range of about 1:1 to about 6:1.

The final compositions employ a polymer resin or matrix system as a binder, preferably an acrylic emulsion or a fluoroelastomer. They are particularly useful as a sheath coating for elongated conductors such as automobile ignition cables.

The invention also relates to the method of applying the compositions to the conductors, and the resulting coated conductor.

DETAILED DESCRIPTION OF THE INVENTION

Figure 1:
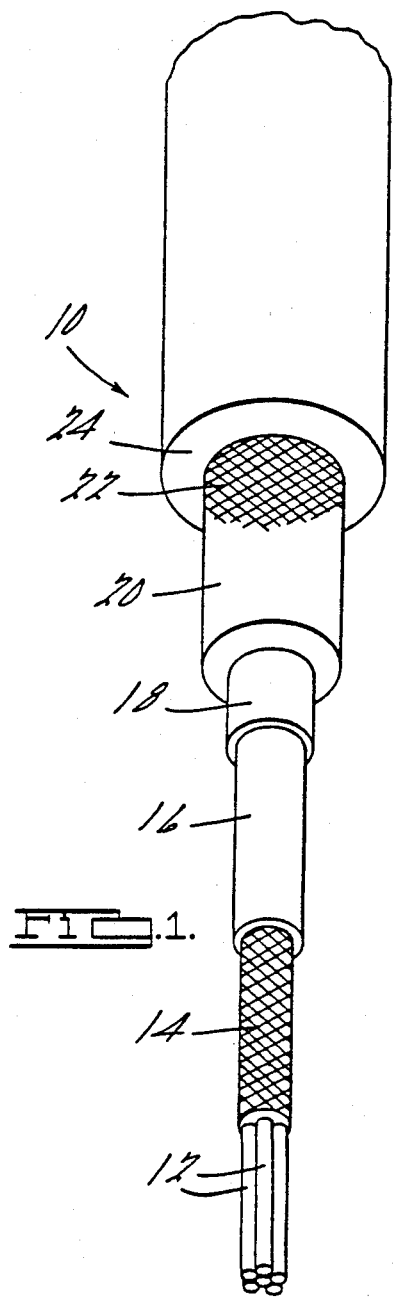

It will be appreciated that a wide variety of carbon-based materials possessing a wide variety of particle shapes and sizes have been employed in polymer-based coatings. These materials have been generally employed as pigments to add conductivity to the final composition. However, it has now been discovered that a certain heretofore unrecognized ground coal-based calcined coke can be employed in combination with a polymer resin to provide an improved resin-coke system for conductive coatings of wide utility. These systems have particular utility as a flexible conductive coating for ignition cables.

It will be appreciated from the above background section that while many elemental carbons and carbpm-based materials which have been used as conductive additives or pigmants. When good conductivity is necessary, graphite has been the additive or pigment of choice.

Graphite, due to its allotropic form and crystalline structure, can he incorporated into a solvent or solvent/resin matrix and provide a final composition which has high conductivity and low resistivity. However, graphite suffers from some disadvantages which make it difficult to employ in coatings; some of these disadvantages appear to be associated with the very crystalline structure which make it so valuable as a conductive material.

Graphite is an allotropic form of elemental carbon consisting of layers of hexagonally arranged carbon atoms in a planar, condensed ring system. The layers are stacked parallel to each other in two possible configurations, hexagonal or rhombohedral. This structure, along with the covalent (sp$^2$ hybridization) bonding within the layers and Van der Waals forces holding the layer-layer arrangement together, make graphite extremely efficient as a conductive material and as a lubricant.

One disadvantage associated with the use of graphite as an additive in polymer compositions is that graphite interferes with peroxide-type curing catalysts which are frequently used in ignition cable compositions.

As a result of this and other disadvantages associated with graphite, the art has frequently turned to other types of elemental carbon such as carbon black, and the like, to provide conductivity. It will be appreciated that the carbon blacks which are adequately conductive are extremely expensive; normal petroleum-based cokes are not adequately conductive.

Coke is generally considered to be the highly carbonaceous product resulting from the pyrolysis of organic material at least parts of which have passed through a liquid or liquid-crystalline state during the carbonation process and which consists of non-graphitic carbon. See *Carbon*, 20:5, pp 445–449 (1982), incorporated herein by reference. Some cokes are capable of acting as conductive additives and pigments; some cokes provide no conductivity.

In addition to being much less expensive than most highly conductive graphites, and not interfering with peroxide-type catalysts, the cokes of the present invention provide another important advantage. The cokes of the present invention can be used at the very high levels necessary for conductivity without unduly increasing the viscosity. The resulting composition will possess a very high solids content at a lower cost and lower viscosity.

Regardless of the level employed, however, conventional conductive cokes simply have not been capable of achieving the level of conductivity that graphite can provide.

It has now been surprisingly discovered that a certain unique coke material is capable of demonstrating a conductivity/resistivity closely approaching that of graphite, but which does not possess the curing, viscosity and cost disadvantages usually associated with graphites.

This unique coke material provides improved conductivity at reduced cost in a wide range of resin and resin solvent systems. The resulting compositions provide a wide variety of utilities. Further, this unique coke has the added advantage of being able to accept other pigments such as magnetic material in the resin system and maintain acceptable conductivity, unlike conventional cokes. The conductivity of the final composition need not be sacrificed by the addition of other pigments.

When employed at the levels and ratios described herein, the final compositions of the present invention possess a conductivity/reduced resistance nearly equivalent to systems employing more expensive graphite, but without many of the major disadvantages associated with graphite.

As mentioned above, the term "coke", as generally used in the art, refers broadly to the many high carbonaceous products of the pryolysis of organic material at least parts of which have passed through a liquid or liquid-crystalline state during the carbonization process and which consist of non-graphitic carbon. However, the term "coke" as applied to the compositions and methods of the instant invention refers to a small select subclass of cokes. From a structural viewpoint, the term "coke", as used herein, characterizes the state of a graphitizable carbon before the actual beginning of graphitization, i.e., before the solid state transformation of the thermodynamically unstable non-graphitic carbon into graphite by thermal activation.

The cokes useful in the practice of the present invention are cokes which have high conductivity/low resistivity and only include a select fraction of the materials generally referred to in the art as "coke". They are coal-based, calcined ground materials.

The cokes useful in the practice of the present invention are primarily classified by the possession of a level of graphitic order which is high enough to provide high conductivity/low resistivity when placed into a polymer matrix. These cokes may be used as in place of graphite in certain compositions and methods; they may also be used in combination with graphite. They are particularly useful in these circumstances (where graphite is to he employed) because they will allow the graphite to be used at a significantly reduced level.

The most effective way of characterizing the cokes of the present invention is by x-ray powder diffraction. The material should be examined employing a conventional powder diffractometer fitted with a pyrolytic graphite monochromatic source. A power source such as a 12 kW rotating anode generator may be employed operating at about 55 kV and 160 mA; a molybdenum anode ($K_\alpha$ radiation), providing an average x-ray wavelength ($\lambda$) about 0.71 Å, is also employed. The sample should be placed in a Lindemann glass tube having a diameter of about 0.8 mm. The c-axis carbon-carbon d-spacings and range of ordering along the c-axis are determined from the width of the carbon 002) peak producing an $E_c$ value. In general, the larger the $E_c$ value, the better the ordering, i.e., graphites have $E_c$ in the range of greater than 200. Cokes of the present invention possess an $E_c$ value of about 27 to about 80, more preferably about 28 to about 75, and still more preferably about 28 to about 65.

Useful cokes of this class may contain greater than about 80 elemental carbon by weight. The cokes preferred for use in the present invention possess a carbon content of greater than about 90 percent, more preferably 94.5 percent, and preferably greater than about 95.0 percent, by weight. In a highly preferred embodiment, the cokes of the instant invention have a carbon content of about 95.0 to about 95.75, and even more preferably about 95.30 to about 95.40, by weight.

The preferred cokes for use in the present invention have an ash content of about 0.1 to about 1.5 percent, by weight of the coke. Even more preferably, the ash content is in the range of about 0.80 to about 1.25, and still more preferably about 1.0 to about 1.15, by weight.

In a highly preferred embodiment, the weight:weight ratio of $SiO_2:Fe_2O_3$ in the ash is in the range of about 3:1 to about 7:1, and still more preferably about 4:1 to about 6:1; in a highly preferred exbodiment the ratio is about 5:1. In these embodiments, the weight:weight ratio of $Fe_2O_3:Al_2O_3$ in the ash is in the range of about 6:1 to about 1:1, and still more preferably about 2:1.

The cokes preferred for use in the present invention contain a level of CaO in the ash of less than about 2.5 percent, more preferably less than about 1.0 percent, and still more preferably less than about 0.5 percent, by weight of the ash. In a highly preferred embodiment, the coke contains a level of CaO of about 0.5 percent, by weight of the ash, or about 0.00005 percent, by weight of the coke.

Ihe cokes preferred for use in the present invention contain a level of $K_2O$ in the ash of less than about 0.75 percent, and more preferably about 0.5, and even more preferably about 0.25, percent by weight of the ash. In a highly preferred embodiment, the coke contains a level of $K_2O$ of less than about 0.20 percent by weight of the ash, or about 0.00002 percent by weight of the coke.

The coke xay be employed with polymer-based binders or matrices alone, or in combination with other magnetic, conductive and non-conductive pigments, including other carbon-based materials. In a preferred embodiment, the final composition may be substantially free of graphite.

Other suitable materials useful in combination with the cokes described above include other elemental carbon fillers and pigments selected from the group consisting of carbon black, petroleum coke, calcined petroleum coke, fluid petroleum coke, metallurgical coke; other non-carbon pigments and additives which are useful include, without limitation, metals and metallic conductive and non-conductive materials such as zinc, aluminum, copper, nickel, ferrophosphorus, dyes, magnetic oxides, colorants, and the like.

Preferred conductive pigments for use in the composition and methods of the present invention include finely divided particulate pigments such as graphite, conductive carbon black, silver particles, copper particles and noble metal particles. Particulate copper and silver are particularly preferred.

Other conductive additives or pigments useful in the compositions of the present invention also include, without limitation, those that are useful in electromagnetic interference protection such as those described in U.S. Pat. No. 3,562,124 expressly incorporated herein by reference. Particularly preferred are refractory alloys selected from the group consisting of ferrophosphorous, ferromanganese, ferromolybdenum, ferrosilicon, ferrochrome, ferrovanadium, ferrozirconium, ferrotitanium, ferrotungsten, ferroboron, and ferrocarbide or iron carbide. Of these refractory alloys, di-iron phosphide is particularly preferred. This material generally contains from about 20 to about 30 percent phosphorous by weight; this corresponds generally to a mixture of $Fe_2P$ and $FeP$. See the materials described in U.S. Pat. No. 4,517,118, also expressly incorporated herein by reference.

The coke is blended or otherwise combined with a resin or matrix system as a binder in any conventional manner. It will be appreciated that the selection of the binder is primarily dependent upon the end use of the conductive coating. For example, when selecting a binder for use in a composition to be employed as an ignition cable coating, it has been observed that it is important to select a binder which will adhere well to the underlying resistive conductor, will be easy to apply, and which can he easily overcoated if desired; it is also important that the binder-coke combination, when allowed to dry, set up or cure, be able to withstand and continue to function at extremes of temperature. The material used in the manufacture of an ignition cable must be able to functionally withstand extremely high temperatures encountered under the hood during long periods of operation. At the same time it is necessary that the cable function at low temperatures encountered when the car is left out in the open unprotected from the environment. It is also important that the cured composition be flexible.

Commercially prepared materials useful in the compositions and methods of the present invention include VITONS (available from DuPont); FLUORELS (available from the 3M Company); RHOPLEXES (available from Rohm and Haas); and BFG 26171 (available from the B. F. Goodrich Company). Other useful fluoroelastomers include those described in U.S. Pat. Nos. 2,968,649; 3,051,677; and 3,172,124; all the foregoing are expressly incorporated herein by reference.

In addition to the polymer binder, other binder-compatible components may employed in the conductive composition of the present invention.

In light of the above, preferred resins for the binders or binder systems of the present invention include conventional elastomers such as hydrocarbon elastomers such as alkyldienes, aqueous silicates, thermoplastic and/or thermosetting acrylics, vinyls, urethanes, alkyds, polyesters, fluoroelastomers and cellulosic resins.

Particularly preferred resins include acrylic emulsion employing methyl acrylates, ethyl acrylates, methyl methacrylates, ethyl ethacrylates, vinyl/olefinic fluoroelastomeric polymers, vinyl-fluorocarbon elastomeric copolymers, vinylidene/fluoro-olefinic elastomeric polymers, and $C_2$–$C_4$ olefinic/fluorocarbon elastomeric copolymers are also preferred, including, without limitation, vinylidene fluoride/hexafluoropropene copolymer fluoroelastomer.

In addition to the polymer binder, other conventional binder-compatible components may be employed in the conductive compositions of the present invention. For example, a suitable solvent or solvent blend or carrier may be employed. The solvent or carrier may be, for example, an organic solvent such as a conventional acrylic or methacrylic solvent system, including aromatic and aliphatic hydrocarbons, halogenated aromatic and aliphatic hydrocarbons, esters, ketones, and alcohols. Water may also he employed as a solvent, co-solvent, or as a solvent for one or more phases of an emulsion system.

It will be appreciated that the selection of the solvent will depend upon many factors including, without limitation, the resin selected, the surface to be coated or material to be impregnated, the end use of the coating, and the like.

Other common resin compatible components typically employed in conductive coating compositions ray also be employed at their art-established levels in the compositions and methods of the present invention including, without limitation, other metallic and non-metallic conductive pigments and additives, magnetic oxide pigments, surfactants, emollients, wetting agents or other surface active agents, thickeners, viscosity reducers, flow control agents, buffers, neutralizing agents, chelating agents, anti-oxidants, curing agents, anti-microbials, anti-fungals, and the like.

In the wet (uncured) compositions of the present invention which are intended to be used as conductive coatings the binder is preferably employed at a level of from about 25 to about 90 percent, by weight of the wet composition. More preferably, the resin is employed at a level of about 25 to about 75 percent, and still more preferably at a level of about 30 to about 60 percent, by weight.

When allowed to cure, dry, "set-up", etc., after application, the resulting coating preferably comprises about 40 percent to about 90 percent, by weight, and more preferably about 50 percent to about 80 percent, by weight, of the binder.

The coke (as expressly defined herein) is employed in the preferred coating compositions of the present invention at a level of about 0.5 percent to about 30 percent, by weight of the wet, uncured composition. More preferably, the coke is employed at a level of about 2 to about 25 percent, and still more preferably, at a level of about 5 to about 15 percent, by weight of the wet composition. In a highly preferred embodiment, the coating compositions of the instant invention employ a level of coke of about 10 percent to about 15 percent, by weight of the wet composition.

As noted above, the coke may be employed alone, or with other carbonaceous materials. When other elemental carbons are employed, such as carbon black, petroleum coke, calcined petroleum coke, fluid petroleum coke, metallurgical coke, and the like, the total elemental carbon in preferred compositions comprises about 0.75 percent to about 35 percent, by weight of the final wet composition. Of this total elemental carbon, about 5 percent to about 95 percent by weight of the total elemental carbon is the unique ground coal-based calcined coke described herein. More preferably, the total elemental carbon is present at a level of about 10 percent to about 25 percent, of which about 75 percent to about 90 percent is the coal-based calcined coke.

The highly preferred ignition cable compositions of the present invention are substantially free of graphite, i.e., they employ less than about 10 percent, more preferably less than about 5 percent, and still more preferably less than about 1 percent graphite, by weight of the wet composition.

In a highly preferred embodiment, the wet coating compositions of the instant invention employ about 25 to about 40 percent deionized water, by weight; about 0.1 to about 10 percent of a thickener, such as hydroxyethyl cellulose and/or an acrylic thickener; about 0 percent to about 5 percent of a second carbon-based pigment or filler; about 0.01 percent to about 2.5 percent of a $C_3$–$C_{12}$ alcohol; and about 0.01 percent to about 2.5 percent of an antimicrobial-antifungal agent such as 2, 2-methylene-BIS-(4-chlorophenol).

In such preferred embodiments, a surfactant or emollient is also employed. Such surfactants are employed at a level of about 0.025 to about 5 percent, by weight of the wet composition, and more preferably at a level of about 0.05 to about 4 percent. In a highly preferred embodiment, the surfactant is employed at a level of about 0.1 percent to about 1 percent, by weight of the wet composition.

Any conventional compatible surfactant may be employed in the ignition cable composition of the present invention. Preferred surfactants include TAMOL SN, a neutral sodium salt of a condensed aryl sulfonic acid sold by the Rohm & Haas Company.

The preferred compositions are preferably about 0.5 to about 80 percent total solids, and still more preferably about 0.5 to about 20 percent total solids, and preferably possess a viscosity of about 3000 to about 4500 cps. Such a combination gives a final product which is easy to apply the necessary coating thickness with the appropriate conductivity.

The preferred compositions, when applied to an auto ignition cable or other flexible conductor surface at a rate which results in a coating thickness of about 0.1 to about ten mils after drying or curing, demonstrate a resistance of about 500 to about 30,000 ohms per square unit, and even more preferably demonstrate a resistance in the range of about 2,500 to about 10,000 ohms per square unit, when a direct current is applied across a one inch distance and measured point to point.

By the term ohms/square or ohms per square, as used herein, is meant ohms per any practical unit. That is, when a coating of a uniform thickness is examined, the resistance to a direct current from point A to point B, (t), is a function of the width of the square, (w), the distance between the points, (d), the thickness of the coating, (t), and the nature of the conductive coating or material. The resistance varies directly with d and inversely with t and w. This can be expressed as $R = (K)(d)(t^{-1})(w^{-1})$. In all squares $w = d$; therefore, the above becomes $R = k/t$. (Again, this is because $w = d$ regardless of whether one is dealing with inches or feet.)

The compositions of the present invention are preferably applied to flexible conductors in a fluid or gelatinous form and allowed to cure or dry in situ. The compositions can be applied in any conventional manner such as brushing, spraying, dipping, wiping, roller-coating, and the like.

The compositions are applied at a rate such that the coating thickness, after drying/curing, is in the range of about 0.5 to about 20 mils; preferably about 0.5 to about 10 xils; and more preferably about 0.5 to about 5 mils.

The compositions of the present invention are useful in the manufacture of an improved elongated flexible conductor for conducting current. The conventional conductor construction, having at least two discrete regions including a conductive region and resistive region, is improved by employing at least one layer or coating comprising elemental carbon and a polymer resin wherein about 5% to about 75% of the elemental carbon is a ground, coal-based calcined coke which has an $E_c$ value of about 27 to about 80, preferably measured as described herein. Preferably, the pigment (elemental carbon) to binder (pigment:binder) ratio is about 2:1 to about 20:1, and more preferably about 5:1 to about 15:1. The conductive region of such construction may be, for example, a segment of graphite impregnated glass fibers, a rubber sheath, or the like; the conductive region may the coke-containing resin.

The compositions of the present invention are useful as resistive coatings or layers in the manufacture of elongated conductor means, particularly flexible elongated conductors.

In a highly preferred embodiment, the compositions of the present invention are used as a coating or covering or layer within a flexible elongated conductor which includes at least one fabric, fiber or filament layer and which is capable of withstanding the temperature extremes which ignition cables used in vehicles with spark ignition.

In general, such ignition cable means comprise: providing (with reference to FIG. 1)

(1) a plurality of graphite impregnated fiberglass conductor elements 12;

(2) a braid material 14 of rayon, cotton, or the like, woven or wrapped around the element to hold said elements together;

(3) a covering or coating composition surrounding the "core" of the ignition cable formed by the conductors 12 and the braid 14, preferably a high temperature-resistant electrically conductive layer; and optionally (4) overlaying the conductive covering or coating 16 is a conductive stripcoating 18 formed of a material which includes a highly conductive pigment. This optional overcoating 18 may be followed by an insulating material 20, further fabric or fiber braid material 22, and an insulating jacket 24.

In the practice of the methods of the present invention, a flexible ignition cable is prepared wherein at least one of the conductive layers, coatings, or elements comprises a conductive coating composition described herein. In a highly preferred embodiment, a flexible ignition cable such as described above is prepared wherein the high temperature resistant electrically conductive layer comprises (i) a ground, calcined, coal-biased coke having an $E_c$ value (as described herein) of about 27 to about 80, and more preferably about ∞ to about 65; and (ii) a polymer binder.

Preferred binders and additive are described herein.

The methods of the present invention comprise the manufacture of an elongated conductor wherein at least one conductive layer is applied which includes:

(a) a ground, calcined, coal-based coke having an $E_c$ value of from about 27 to about 80; and (b) a polymer binder.

Again, the suitable binders are described herein.

Such cables are manufactured in any convenient manner, such as that described in U.S. Pat. Nos. 3,284,751 issued Nov. 8, 1966, and 3,870,987 issued Mar. 11, 1975, the specification of both being incorporated herein by reference. In addition to the compositions of the present invention, the methods may generally employ any other conventional compositions or additives at their art-established levels, and may employ any other conventional element or structure in their art-established manner. For example, upon completion of the manufacture, a portion of the sheathing may be removed or folded back, and the tip of the conductor may be dipped into a suspension of highly conductive noble metal particles, such as Electrodag +503, available from the Acheson Colloids Company.

All ingredients are added and admixed in a conventional manner unless otherwise noted.

In order to furthur illustrate the benefits and advantages of the present invention, the following specific examples are provided. It will be understood that the examples are provided for illustrative purposes and are not intended to be limiting of the scope of the invention as herein disclosed and as set forth in the claims.

See also commonly assigned U.S. patent application Ser. No. 757,084, "Conductive Cathodic Protection Compositions and Methods", Robert E. Wiley; and U.S. patent application Ser. No. 757,029, "Conductive Coatings and Foams for Anti-Static Protection, Energy Absorption, and Electromagnetic Compatability", Robert E. Wiley, both filed herewith; both expressly incorporated herein by reference.

IGNITION CABLE FORMULATIONS

| | Identity | Source |
|---|---|---|
| Base No. 1 | | |
| 23.25 Coke* | | |
| 4.65 Carbon Black | | |
| 0.93 QP40H | Hydroxyethyl Cellulose | Union Carbide |
| 0.32 Sindar G-4 | 2,2 Methylene BIS (4-Chlorophenol) | Givardon |
| 0.23 Octyl Alcohol | 1-Octanol | Matheson |
| 0.84 Tamol SN | Neutral Sodium Salt of Condensed Aryl Sulfonic Acid | Rohm and Haas |
| 69.78 Deionized Water | Deionized Water | ACUS |
| 100.00 | | |
| The above mixture is Pebble milled for about 40 hours to about an 8 Hegmann. | | |
| % Solids | 30% | |
| Viscosity | 100–200 cps | |
| pH | 8+ | |
| Lbs/gallon | 9.83 | |
| Base No. 2 | | |
| 29.34 Coke* | | |
| 4.32 Carbon Black | | |
| 0.99 Cellosize QP40H | Hydroxyethyl Cellulose | Union Carbide |
| 0.33 Sindar G-4 | 2,2 Methylene BIS (4-Chlorophenol) | Givardon |
| 0.22 Octyl Alcohol | 1-Octanol | Matheson |
| 0.54 Tamol SN | Neutral Sodium Salt of Condensed Aryl Sulfonic Acid | Rohm and Haas |
| 64.26 Deionized Water | Deionized Water | ACUS |
| 100.00 | | |
| The above mixture is Pebble milled for about 24 hours to about an 8 Hegmann. | | |
| % Solids | 35.5% | |
| Viscosity | 660 cps | |
| pH | 8+ | |
| Lbs/Gallon | 9.91 | |

The following formulations are effectively employed in the manufacture of an automobile ignition cable and possess the properties described.

| | Identity | Source |
|---|---|---|
| Formulation No. 1 | | |
| 52.00 Rhoplex 1829 | Acrylic Emulsion | Rohm and Haas |
| 42.00 Base No. 1 | | |
| 6.00 Deionized Water | | |
| 100.00 | | |
| Resistance | 1.51KΩ 1" Point to Point | |
| Formulation No. 2 | | |
| 46.50 Rhoplex 1895 | Acrylic Emulsion | Rohm and Haas |
| 46.50 Base No. 1 | | |
| 7.00 Deionized Water | | |
| 100.00 | | |
| Resistance | 0.77KΩ 1" Point to Point | |
| Formulation No. 3 | | |
| 57.00 BFG No. 2671 | Acrylic Emulsion | B. F. Goodrich |
| 38.00 Base No. 1 | | |
| 5.00 Deionized Water | | |
| 100.00 | | |
| Resistance | 0.60KΩ 1" Point to Point | |
| Formulation No. 4 | | |

-continued

| | Identity | Source |
|---|---|---|
| 24.00 BFG No. 26171 | Acrylic Emulsion | B. F. Goodrich |
| 24.00 Rhoplex 1829 | Acrylic Emulsion | Rohm and Haas |
| 47.00 Base No. 1 | | |
| 5.00 5% (28% Ammonia) in Deionized Water | | |
| 100.00 | | |
| Resistance | 2.5KΩ 1" Point to Point | |

Formulation No. 5

| | | |
|---|---|---|
| 46.00 Base No. 1 | | |
| 35.00 Rhoplex 1829 | Acrylic Emulsion | Rohm and Haas |
| 12.00 Rhoplex HA8 | Acrylic Emulsion | Rohm and Haas |
| 7.00 Deionized Water | | |
| 100.00 | | |
| Resistance | 0.98K 1" Point to Point | |

Formulation No. 6

| | | |
|---|---|---|
| 45.00 Base No. 2 | | |
| 45.00 Rhoplex HA8 | Acrylic Emulsion | Rohm and Haas |
| 10.00 Deionized Water | | |
| 100.00 | | |
| Resistance | 5.64KΩ 1" Point to Point | |

Formulation No. 7

| | | |
|---|---|---|
| 45.45 Base No. 2 | | |
| 45.45 BFG 26171 B. F. Goodrich | Acrylic Emulsion | |
| 9.10 Deionized Water | | |
| 100.00 | | |

Substantially similar results are obtained when the remaining carbonaceous material above is replaced, in whole or in part, with coke*.

Formulation No. 8

40–80 percent Base No. 1
20–40 percent Viton L-31**
qsp-100 water

*indicates that this material has an $E_c$ of about 29.
**a commercially prepared fluoroelastomer available from DuPont.

What is claimed is:

1. A conductive coating composition useful in the manufacture of an elongated conductive means comprising:
   (a) about 0.75 percent to about 35 percent total elemental carbon, by weight of the composition;
   (b) about 25 percent to about 90 percent of a polymeric binder, by weight of the composition;
   (c) about 9.25 percent to about 74.25 percent of a carrier, by weight of the composition; and
   (d) about 0 percent to about 5 percent of a surfactant, by weight of the composition;
   wherein about 5 percent to about 90 percent of said total elemental carbon, by weight of the elemental carbon, is a ground coal-based, calcined coke, said coke demonstrating an $E_c$ value of about 27 to about 80.

2. A composition according to claim 1 wherein the elemental carbon is present at a level of about 10 percent to about 25 percent, by weight of the composition.

3. A composition according to claim 2 wherein about 75 percent to about 90 percent of the elemental carbon, by weight of the elemental carbon, is the coal-based, calcined coke.

4. A composition according to claim 3 wherein the surfactant is present at a level of about 1 percent to about 2 percent, by weight of the composition.

5. A composition according to claim 1 wherein the polymeric binder is selected from the group consisting of aqueous silicate solutions, thermoplastic acrylic, vinyl, urethane, alkyd, polyester, hydrocarbon, fluroelastomer and cellulosic resins, and thermosetting acrylic, polyester, epoxy, phenolic, urethane and alkyd resins.

6. A composition according to claim 5 wherein the resin is a fluoroelastomer.

7. A composition according to claim 5 wherein the resin is a hydrocarbon elastomer.

8. A composition according to claim 5 wherein the polymeric binder is selected from the group consisting of acrylic and acrylic latex polymers.

9. A composition according to claim 8 wherein the polymeric binder is selected from the group consisting of acrylic and acrylic acid, methyl acrylate, ethyl acrylate, methyl methacrylate, ethyl methacrylate, and mixtures thereof.

10. A composition according to claim 9 wherein the carrier is a blend that includes water.

11. A composition according to claim 10 wherein the binder is an acrylic emulsion.

12. A composition according to claim 3 which additionally comprises:
    (a) about 0.1 percent to about 10 percent of a thickener;
    (b) about 0.01 percent to about 2.5 percent of a $C_3$–$C_{12}$ fatty alcohol; and
    (c) about 0.01 percent to about 2.5 percent of a compound selected from the group consisting of antimicrobials, antifungals, and mixtures thereof.

13. A composition according to claim 3 which additionally comprises:
    (a) a conductive additive selected from the group consisting of copper, silver, nickel, tin oxide, noble metals, refractory alloys, and mixtures thereof.

14. A conductive coating composition useful in the manufacture of an elongated conductive means comprising:
    (a) about 0.75 percent to about 35 percent total elemental carbon, by weight of the composition;
    (b) about 25 percent to about 90 percent of a polymeric binder, by weight of the composition;
    (c) about 9.25 percent to about 74.25 percent of a carrier, by weight of the composition; and
    (d) about 0 percent to about 5 percent of a surfactant, by weight of the composition;
    werein substantially all of the elemental carbon is a ground coal-based, calcined coke, said coke demonstrating an $E_c$ value of about 27 to about 80.

15. A composition according to claim 14 wherein the resin is a fluoroelastomer.

16. A composition according to claim 15 which additionally comprises:
    (a) about 0.1 percent to about 10 percent of a thickener;
    (b) about 0.01 percent to about 2.5 percent of a $C_3$–$C_{12}$ fatty alcohol; and
    (c) about 0.01 percent to about 2.5 percent of a compound selected from the group consisting of antimicrobials, antifungals, and mixtures thereof.

17. A composition according to claim 16 which additionally comprises:
    a conductive additive selected from the group consisting of copper, silver, nickel, tin oxide, noble metals, refractory alloys, and mixtures thereof.

18. A composition according to claim 1 wherein the $E_c$ value is measured for the 002 peak when subjected to x-ray powder diffraction employing Mo $K_\alpha$ radiation with an average wavelength of 0.71 Å.

19. A composition according to claim 18 wherein the $E_c$ value is measured for the 002 peak when subjected to x-ray powder diffraction ploying Mo $K_\alpha$ radiation with an average wavelength of 0.71 Å.

20. A composition according to claim 14 wherein the $E_c$ value is measured for the 002 peak when subjected to x-ray powder diffraction ploying Mo $K_\alpha$ radiation with an average wavelength of 0.71 Å.

21. A conductive coating composition useful in the manufacture of an elongated conductive means comprising:
   (a) about 10 percent to about 25 percent total elemental carbon, by weight of the composition;
   (b) about 30 percent to about 60 percent of a polymeric binder, by weight of the composition;
   (c) about 9.25 percent to about 74.25 percent of a carrier, by weight of the composition; and
   (d) about 0 percent to about 5 percent of a surfactant, by weight of the composition;
wherein about 75 percent to about 90 percent of said total elemental carbon, by weight of the elemental carbon, is a ground coal-based, calcined coke, said coke demonstrating an $E_c$ value of about 27 to about 80.

22. A composition according to claim 21 wherein the surfactant is present at a level of about 1 percent to about 2 percent, by weight of the composition.

23. A composition according to claim 21 wherein the polymeric binder is selected from the group consisting of aqueous silicate solutions, thermoplastic acrylic, vinyl, urethane, alkyd, polyester, hydrocarbon, fluoroelastomer and cellulosic resins, and thermosetting acrylic, polyester, epoxy, phenolic, urethane and alkyd resins.

24. A composition according to claim 21 which additionally comprises:
   (a) about 0.1 percent to about 10 percent of a thickener;
   (b) about 0.01 percent to about 2.5 percent of a $C_3$–$C_{12}$ fatty alcohol; and
   (c) about 0.01 percent to about 2.5 percent of a compound selected from the group consisting of antimicrobials, antifungals, and mixtures thereof.

* * * * *

UNITED STATES PATENT AND TRADEMARK OFFICE
CERTIFICATE OF CORRECTION

PATENT NO. : 4,818,438
DATED : April 4, 1989
INVENTOR(S) : Robert E. Wiley

It is certified that error appears in the above-identified patent and that said Letters Patent is hereby corrected as shown below:

Column 2, line 50, "Ihey" should be --They--.

Column 2, line 64, "ccmpositions" should be --compositions--.

Column 3, lines 4 and 5, "carbpm-based" should be --carbon-based--.

Column 3, line 6, "pigmants" should be --pigments--.

Column 4, line 14, "pryolysis" should be --pyrolysis--.

Column 4, line 39, "he" should be --be--.

Column 5, line 9, "exbodiment" should be --embodiment--.

UNITED STATES PATENT AND TRADEMARK OFFICE
CERTIFICATE OF CORRECTION

PATENT NO. : 4,818,438
DATED : April 4, 1989
INVENTOR(S) : Robert E. Wiley

It is certified that error appears in the above-identified patent and that said Letters Patent is hereby corrected as shown below:

Column 5, line 21, "Ihe" should be --The--.

Column 5, line 30, "xay" should be --may--.

Column 6, line 10, "he" should be --be--.

Column 6, line 33, after "may" insert --be--.

Column 6, line 43, "ethacrylates" should be --methacrylates--.

Column 6, line 59, "he" should be --be--.

Column 6, line 68, "ray" should be --may--.

Column 7, line 1, "he" should be --be--.

Column 7, line 28, "mcre" should be --more--.

Column 7, line 45, "abo:t" should be --about--.

Column 7, line 53, "ccmposition" should be --composition--.

Column 8, line 47, "xils" should be --mils--.

Column 9, line 34, "coal-biased" should be --coal-based--.

UNITED STATES PATENT AND TRADEMARK OFFICE
CERTIFICATE OF CORRECTION

Page 3 of 3

PATENT NO. : 4,818,438
DATED : April 4, 1989
INVENTOR(S) : Robert E. Wiley

It is certified that error appears in the above-identified patent and that said Letters Patent is hereby corrected as shown below:

Column 9, line 36, "oo" should be --28--.

Column 9, line 63, "furthur" should be --further--.

Column 10, line 2, "Ccnductive" should be --Conductive--.

Column 11, line 16, "0.98K 1" Point to Point" should be --0.98KΩ1" Point to Point--.

Column 11, line 25, "B.F. Goodrich" should appear under column entitled "Source" instead of appearing under "45.45 BFG 26171".

Column 11, line 68, claim 5, "fluroelas-" should be --fluoroelas- --.

Column 12, line 7, claim 8, "ccmposition" should be --composition--.

Column 12, line 15, claim 10, "ccmposition" should be --composition--.

Column 14, lines 9 and 10, claim 23, "fluorelastomer" should be --fluoroelastomer--.

Signed and Sealed this

Sixteenth Day of January, 1990

*Attest:*

JEFFREY M. SAMUELS

*Attesting Officer*  *Acting Commissioner of Patents and Trademarks*